United States Patent
Delker

(10) Patent No.: US 9,098,368 B1
(45) Date of Patent: *Aug. 4, 2015

(54) LOADING BRANDED MEDIA OUTSIDE SYSTEM PARTITION

(71) Applicant: Sprint Communications Company L.P., Overland Park, KS (US)

(72) Inventor: Jason R. Delker, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/066,947

(22) Filed: Oct. 30, 2013

Related U.S. Application Data

(63) Continuation of application No. 13/149,505, filed on May 31, 2011, now Pat. No. 8,612,967.

(51) Int. Cl.
   *G06F 9/445* (2006.01)

(52) U.S. Cl.
   CPC .......................................... *G06F 8/61* (2013.01)

(58) Field of Classification Search
   CPC .............. G06F 8/06; G06F 8/01; G06F 8/60; G06F 8/63; G06F 8/71
   USPC ........................................................ 717/175
   See application file for complete search history.

(56) References Cited

U.S. PATENT DOCUMENTS

| | | | |
|---|---|---|---|
| 7,165,191 B1 | 1/2007 | Vakrat | |
| 7,266,371 B1 | 9/2007 | Amin et al. | |
| 7,493,111 B2 | 2/2009 | Knowles | |
| 7,817,988 B2 | 10/2010 | Kruis et al. | |
| 7,904,895 B1 * | 3/2011 | Cassapakis et al. | 717/168 |
| 8,107,926 B2 | 1/2012 | Goto | |
| 8,185,101 B1 | 5/2012 | Wiseman et al. | |
| 8,260,281 B2 | 9/2012 | Urbanek | |
| 8,401,538 B2 | 3/2013 | Urbanek | |
| 8,401,595 B2 | 3/2013 | Zhu et al. | |
| 8,433,953 B1 | 4/2013 | Gaudette et al. | |

(Continued)

FOREIGN PATENT DOCUMENTS

| | | |
|---|---|---|
| WO | 2012078753 A1 | 6/2012 |
| WO | 2013169983 A1 | 11/2013 |

(Continued)

OTHER PUBLICATIONS

First Action Interview Pre-Interview Communication dated Sep. 22, 2014, U.S. Appl. No. 13/468,028, filed May 9, 2013.

(Continued)

*Primary Examiner* — Ryan Coyer
*Assistant Examiner* — Hui-Wen Lin

(57) ABSTRACT

A portable electronic device is provided. The portable electronic device comprises a processor, a memory, and an installation application stored in the memory, that, when executed by the processor, detects stored information outside a system partition of the portable electronic device. The portable electronic device also identifies a set of files stored outside of the system partition, the set of files associated with a replacement branding and containing a first instruction. The portable electronic device also installs, in response to executing the first instruction, the set of files to a first partition of the portable electronic device wherein the set of files overwrite an initial set of files associated with an initial branding.

19 Claims, 6 Drawing Sheets

(56) References Cited

U.S. PATENT DOCUMENTS

| | | | |
|---|---|---|---|
| 8,571,536 B2 | 10/2013 | Urbanek | |
| 8,612,967 B1 | 12/2013 | Delker | |
| 8,626,165 B1 | 1/2014 | Narasimhan et al. | |
| 8,666,383 B1 | 3/2014 | Mauer et al. | |
| 8,825,039 B2 | 9/2014 | Mizuguchi | |
| 8,909,291 B1 | 12/2014 | Spanel et al. | |
| 2002/0091931 A1 | 7/2002 | Quick, Jr. et al. | |
| 2003/0217145 A1 | 11/2003 | Leung et al. | |
| 2004/0033798 A1 | 2/2004 | Robin et al. | |
| 2004/0092248 A1 | 5/2004 | Kelkar et al. | |
| 2004/0093109 A1 | 5/2004 | O'Connor et al. | |
| 2004/0116163 A1 | 6/2004 | Kim et al. | |
| 2004/0137890 A1 | 7/2004 | Kalke | |
| 2004/0137891 A1 | 7/2004 | Clark et al. | |
| 2005/0085222 A1 | 4/2005 | Przybilski et al. | |
| 2005/0119001 A1 | 6/2005 | Watanabe | |
| 2005/0188262 A1 | 8/2005 | Rosenman et al. | |
| 2005/0197098 A1 | 9/2005 | Trossen | |
| 2006/0025151 A1 | 2/2006 | Karaoguz et al. | |
| 2006/0135144 A1 | 6/2006 | Jothipragasam | |
| 2006/0154651 A1 | 7/2006 | Knowles | |
| 2006/0203722 A1 | 9/2006 | Oommen | |
| 2006/0208071 A1 | 9/2006 | Chang et al. | |
| 2006/0235944 A1 | 10/2006 | Haslam | |
| 2006/0236325 A1 | 10/2006 | Rao et al. | |
| 2006/0246949 A1 | 11/2006 | Gupta et al. | |
| 2007/0004404 A1 | 1/2007 | Buckley et al. | |
| 2007/0082655 A1 | 4/2007 | Link et al. | |
| 2007/0099599 A1 | 5/2007 | Smith et al. | |
| 2007/0129057 A1 | 6/2007 | Xu et al. | |
| 2007/0130156 A1* | 6/2007 | Tenhunen et al. | 707/10 |
| 2007/0165654 A1 | 7/2007 | Chai et al. | |
| 2007/0169084 A1 | 7/2007 | Frank et al. | |
| 2007/0190939 A1 | 8/2007 | Abel | |
| 2007/0197234 A1 | 8/2007 | Gill et al. | |
| 2007/0250645 A1 | 10/2007 | Meadows et al. | |
| 2007/0254635 A1 | 11/2007 | Montelius | |
| 2008/0039114 A1 | 2/2008 | Phatak et al. | |
| 2008/0046583 A1 | 2/2008 | Rao | |
| 2008/0046880 A1 | 2/2008 | Jun et al. | |
| 2008/0046997 A1 | 2/2008 | Wang | |
| 2008/0062900 A1 | 3/2008 | Rao | |
| 2008/0065753 A1 | 3/2008 | Rao | |
| 2008/0109662 A1 | 5/2008 | Natarajan et al. | |
| 2008/0146280 A1 | 6/2008 | Sasse et al. | |
| 2008/0167027 A1 | 7/2008 | Gautier et al. | |
| 2008/0171532 A1 | 7/2008 | Shieh et al. | |
| 2008/0225806 A1 | 9/2008 | Arian et al. | |
| 2008/0281511 A1 | 11/2008 | Miyata | |
| 2008/0318547 A1 | 12/2008 | Ballou, Jr. et al. | |
| 2009/0061840 A1 | 3/2009 | Fleischman et al. | |
| 2009/0093242 A1 | 4/2009 | Bhalekar et al. | |
| 2009/0094350 A1 | 4/2009 | Rive et al. | |
| 2009/0106200 A1 | 4/2009 | Salinas et al. | |
| 2009/0124250 A1 | 5/2009 | Topaltzas et al. | |
| 2009/0156209 A1 | 6/2009 | Franklin et al. | |
| 2009/0239518 A1 | 9/2009 | Feuillette | |
| 2009/0247124 A1 | 10/2009 | De Atley et al. | |
| 2009/0260004 A1* | 10/2009 | Datta et al. | 717/175 |
| 2009/0307763 A1 | 12/2009 | Rawlins et al. | |
| 2010/0048193 A1 | 2/2010 | Ortion et al. | |
| 2010/0060456 A1 | 3/2010 | Forster | |
| 2010/0075669 A1 | 3/2010 | Sparks et al. | |
| 2010/0080143 A1 | 4/2010 | Topaltzas et al. | |
| 2010/0133335 A1 | 6/2010 | Maguid et al. | |
| 2010/0136960 A1 | 6/2010 | Knezevic | |
| 2010/0159876 A1 | 6/2010 | Brown et al. | |
| 2010/0161724 A1 | 6/2010 | Sathyan et al. | |
| 2010/0167696 A1 | 7/2010 | Smith et al. | |
| 2010/0192120 A1 | 7/2010 | Raleigh | |
| 2010/0203864 A1 | 8/2010 | Howard | |
| 2010/0207742 A1 | 8/2010 | Buhot et al. | |
| 2010/0222047 A1 | 9/2010 | Vanderlinden et al. | |
| 2010/0262638 A1* | 10/2010 | Fitzgerald | 707/822 |
| 2010/0291898 A1 | 11/2010 | Sanding et al. | |
| 2010/0311404 A1 | 12/2010 | Shi et al. | |
| 2010/0312794 A1 | 12/2010 | Liu | |
| 2010/0325622 A1* | 12/2010 | Morton | 717/168 |
| 2010/0332639 A1 | 12/2010 | Diaz et al. | |
| 2011/0003590 A1 | 1/2011 | Yoon et al. | |
| 2011/0014913 A1 | 1/2011 | Yoon et al. | |
| 2011/0026501 A1 | 2/2011 | Sharaga et al. | |
| 2011/0028138 A1 | 2/2011 | Davies-Moore et al. | |
| 2011/0030062 A1 | 2/2011 | Hsu et al. | |
| 2011/0035421 A1 | 2/2011 | Laird-McConnell et al. | |
| 2011/0081885 A1 | 4/2011 | Sennett et al. | |
| 2011/0119716 A1 | 5/2011 | Coleman, Sr. | |
| 2011/0138074 A1 | 6/2011 | Onda et al. | |
| 2011/0161659 A1 | 6/2011 | Himawan et al. | |
| 2011/0165836 A1 | 7/2011 | Dixon et al. | |
| 2011/0208338 A1 | 8/2011 | Eteminan et al. | |
| 2011/0222404 A1 | 9/2011 | Watson et al. | |
| 2011/0230136 A1 | 9/2011 | Washiro | |
| 2011/0258249 A1 | 10/2011 | Biggs et al. | |
| 2011/0263294 A1 | 10/2011 | Kim et al. | |
| 2011/0296399 A1 | 12/2011 | Tugnawat et al. | |
| 2011/0306318 A1 | 12/2011 | Rodgers et al. | |
| 2011/0314129 A1 | 12/2011 | Rezaiifar et al. | |
| 2012/0027059 A1 | 2/2012 | Zhao et al. | |
| 2012/0036282 A1 | 2/2012 | Chen et al. | |
| 2012/0046022 A1 | 2/2012 | Kalke et al. | |
| 2012/0047227 A1 | 2/2012 | Haggerty et al. | |
| 2012/0094684 A1 | 4/2012 | Reddy | |
| 2012/0106509 A1 | 5/2012 | Klingenbrunn et al. | |
| 2012/0129513 A1 | 5/2012 | van der Laak | |
| 2012/0129572 A1 | 5/2012 | Johnstone et al. | |
| 2012/0135733 A1 | 5/2012 | Cormier et al. | |
| 2012/0158580 A1 | 6/2012 | Eram et al. | |
| 2012/0203824 A1 | 8/2012 | Oommen | |
| 2012/0208511 A1 | 8/2012 | Vanderlinden et al. | |
| 2012/0230587 A1 | 9/2012 | Arseneau | |
| 2012/0260095 A1 | 10/2012 | Von Hauck et al. | |
| 2012/0276872 A1 | 11/2012 | Knauth et al. | |
| 2012/0282891 A1 | 11/2012 | Mohammed et al. | |
| 2012/0282924 A1 | 11/2012 | Tagg et al. | |
| 2013/0023235 A1 | 1/2013 | Fan et al. | |
| 2013/0031191 A1 | 1/2013 | Bott | |
| 2013/0031234 A1 | 1/2013 | Alfano et al. | |
| 2013/0046951 A1 | 2/2013 | Jones | |
| 2013/0065578 A1 | 3/2013 | Raleigh et al. | |
| 2013/0072168 A1 | 3/2013 | Colucciello et al. | |
| 2013/0085914 A1 | 4/2013 | McPherson et al. | |
| 2013/0111461 A1 | 5/2013 | Zubas et al. | |
| 2013/0198567 A1 | 8/2013 | Ahmed et al. | |
| 2013/0303142 A1 | 11/2013 | Burcham et al. | |
| 2013/0310003 A1 | 11/2013 | Sadhvani et al. | |
| 2013/0311836 A1 | 11/2013 | Hurst et al. | |
| 2014/0045483 A1 | 2/2014 | Whidden | |
| 2014/0080467 A1 | 3/2014 | Urbanek | |
| 2014/0113610 A1 | 4/2014 | Ramprasad et al. | |
| 2014/0206313 A1 | 7/2014 | Spanel et al. | |
| 2014/0228012 A1 | 8/2014 | Annan et al. | |
| 2014/0228042 A1 | 8/2014 | Annan et al. | |
| 2014/0274032 A1 | 9/2014 | Shipley et al. | |
| 2014/0373184 A1 | 12/2014 | Mahaffey et al. | |
| 2015/0065105 A1 | 3/2015 | Masterson et al. | |

FOREIGN PATENT DOCUMENTS

| | | |
|---|---|---|
| WO | 2014046814 A1 | 3/2014 |
| WO | WO2014113128 A1 | 7/2014 |
| WO | WO2014123758 A1 | 8/2014 |
| WO | WO2014123759 A1 | 8/2014 |
| WO | WO2014158430 A1 | 9/2014 |
| WO | WO2015030945 A1 | 3/2015 |

OTHER PUBLICATIONS

Final Office Action dated Sep. 19, 2014, U.S. Appl. No. 13/622,234, filed Sep. 18, 2012.
FAIPP Pre-Interview Communication dated Mar. 19, 2014, U.S. Appl. No. 13/744,847, filed Jan. 18, 2013.
Notice of Allowance dated Aug. 4, 2014, U.S. Appl. No. 13/744,847, filed Jan. 18, 2013.

(56) References Cited

OTHER PUBLICATIONS

FAIPP Pre-Interview Communication dated Jul. 16, 2014, U.S. Appl. No. 13/744,861, filed Jan. 18, 2013.
Final Office Action dated Aug. 19, 2014, U.S. Appl. No. 13/763,434, filed Feb. 8, 2013.
Office Action dated Aug. 7, 2014, U.S. Appl. No. 13/831,504, filed Mar. 14, 2013.
Foreign Communication From a Related Counterpart Application, International Search Report and Written Opinion dated Jan. 24, 2014, International Application No. PCT/US13/68981 filed on Nov. 7, 2013.
Spanel, Robert L., et al., Patent Application entitled "Dynamic Remotely Managed SIM Profile" U.S. Appl. No. 13/744,847, filed Jan. 18, 2013.
Urbanek, Robert E., "Delivery of Branding Content and Customizations to a Mobile Communication Device", filed Oct. 23, 2013, U.S. Appl. No. 14/060,712.
Urbanek, Robert E., "Delivery of Branding Content and Customizations to a Mobile Communication Device", filed , 201, International Serial No. PCT/US14/56778.
Urbanek, Robert E., "Implementation of Remotely Hosted Branding Content and Customizations", filed Oct. 23, 2013, U.S. Appl. No. 14/085,474.
Urbanek, Robert E., "Subscriber Identity Module Virtualization", filed Nov. 20, 2013, U.S. Appl. No. 14/060,719.
Indurkar, Dhananjay, "System and Method of Branding a Device Independent of Device Activation", filed Jan. 24, 2014, U.S. Appl. No. 14/163,035.
Sumner, Bret D., "Directing Server Connection Based on Location Identifier", filed Aug. 15, 2013, U.S. Appl. No. 13/968,259.
Abou-El-Ella, Hassan, et al., "Segmented Customization Payload Delivery", filed Aug. 27, 2013, U.S. Appl. No. 14/010,518.
Sumner, Bret D., "Segmented Customization Package Within Distributed Server Architecture", filed Aug. 27, 2013, U.S. Appl. No. 14/010,522.
Masterson, Michelle E., et al., "Development and Testing of Payload Receipt by a Portable Electronic Device", filed Aug. 27, 2013, U.S. Appl. No. 14/010,523.
Masterson, Michelle E., et al., "System and Methods for Deferred and Remote Device Branding", filed Aug. 27, 2013, U.S. Appl. No. 14/010,524.
Masterson, Michelle E., et al., "System and Methods for Deferred and Remote Device Branding", filed Jul. 16, 2014, International Serial No. PCT/US14/46773.
Callan, Jeffery S., et al., "Delivery of Oversized Branding Elements for Customization", filed Nov. 6, 2013, U.S. Appl. No. 14/073,321.
Indurkar, Dhananjay, "Background Delivery of Device Configuration and Branding", filed Jan. 16, 2014, U.S. Appl. No. 14/157,507.
Ahn, Chul Jin, et al., "Separation of Client Identification Composition from Customization Payload to Original Equipment Manufacturer Layer", filed Nov. 8, 2013, U.S. Appl. No. 14/075,687.
Ghoshal, Jagannath, et al., "Multiple Carrier Partition Dynamic Access on a Mobile Device", filed Jun. 5, 2014, U.S. Appl. No. 14/297,429.
Indurkar, Dhananjay, "Activation Sequence Using Permission Based Connection to Network", filed Jan. 24, 2014, U.S. Appl. No. 14/163,041.
Ahn, Chul Jin, et al., "Customization for Preloaded Applications", filed Mar. 31, 2014, U.S. Appl. No. 14/231,718.
Foreign Communication from a Related Counterpart—International Search Report and Written Opinion, dated Jun. 3, 2014,PCT/US14/16650, filed on Feb. 16, 2014.
Foreign Communication from a Related Counterpart Application, "Preliminary Report on Patentability", dated Jun. 20, 2013, PCT/US2011/063736 filed on Dec. 7, 2011.
Foreign Communication from a Related Counterpart—International Search Report and Written Opinion, dated Nov. 14, 2013, PCT/US13/55023, filed on Aug. 15, 2013.
Mauer, Brian D., et al., "Automatic Branding of Generic Applications", filed Jan. 10, 2013, U.S. Appl. No. 14/152,627.

Urbanek, Robert E., "Generic Mobile Devices Customization Framework", filed Aug. 15, 2013, International Serial No. PCT/US13/55023.
Annan, Brandon C., et al.,"System and Method of Storing Service Brand Packages on a Mobile Device", filed Jan. 30, 2014, International Serial No. PCT/US14/13936.
Annan, Brandon C., et al.,"System and Method of Provisioning and Reprovisioning a Mobile Device Based on Self-locating", filed filed Jan. 30, 2014, International Serial No. PCT/US14/13939.
Foreign Communication from a Related Counterpart—International Search Report and Written Opinion, dated Feb. 29, 2012, PCT/US2011/063736, filed on Dec. 7, 2011.
Foreign Communication from a Related Counterpart—International Search Report and Written Opinion, dated Jul. 24, 2013, PCT/US13/40278, filed on May 9, 2013.
Notice of Allowance dated Apr. 26, 2012, U.S. Appl. No. 12/962,620, filed Dec. 7, 2010.
Notice of Allowance dated Nov. 2, 2012, U.S. Appl. No. 13/556,202, filed Jul. 24, 2012.
Notice of Allowance dated Jun. 11, 2013, U.S. Appl. No. 13/752,386, filed Jan. 28, 2013.
First Action Interview Pre-Interview Communication dated Feb. 25, 2013, U.S. Appl. No. 13/149,505, filed May 31, 2013.
First Action Interview Office Action dated May 8, 2013, U.S. Appl. No. 13/149,505, filed May 31, 2013.
Notice of Allowance dated Aug. 9, 2013, U.S. Appl. No. 13/149,505, filed May 31, 2013.
First Action Interview Pre-Interview Communication dated Aug. 13, 2013, U.S. Appl. No. 13/335,941, filed Dec. 23, 2011.
Notice of Allowance dated Oct. 9, 2013, U.S. Appl. No. 13/335,941, filed Dec. 23, 2011.
Urbanek, Robert E., "System and Method of Wireless Communication", filed Dec. 7, 2010, U.S. Appl. No. 12/962,620.
Urbanek, Robert E., "System and Method for Generic Mobile Phone Configuration", filed Jul. 24, 2012, U.S. Appl. No. 13/556,202.
Urbanek, Robert E., "System and Method for Generic Mobile Phone Configuration", filed Jan. 28, 2013, U.S. Appl. No. 13/752,386.
Delker, Jason R., "Loading Branded Media Outside System Partition", filed May 31, 2011 U.S. Appl. No. 13/149,505.
Mauer, Brian D., et al., "Automatic Branding of Generic Applications", filed Dec. 23, 2011 U.S. Appl. No. 13/335,941.
Urbanek, Robert E., "Generic Mobile Devices Customization Framework", filed Sep. 18, 2012, U.S. Appl. No. 13/622,234.
Annan, Brandon C., et al.,"System and Method of Branding and Labeling a Mobile Device", filed Mar. 15, 2013, U.S. Appl. No. 13/844,104.
Annan, Brandon C., et al.,"System and Method of Storing Service Brand Packages on a Mobile Device", filed Feb. 8, 2013, U.S. Appl. No. 13/763,428.
Annan, Brandon C., et al.,"System and Method of Provisioning and Reprovisioning a Mobile Device Based on Self-locating", filed Feb. 8, 2013, U.S. Appl. No. 13/763,434.
Annan, Brandon C., et al.,"Electronic Fixed Brand Labeling", filed Feb. 8, 2013, U.S. Appl. No. 13/763,443.
Ghoshal, Jagannath, et al.,"Rebranding a Portable Electronic Device While Maintaining User Data", filed May 22, 2013, U.S. Appl. No. 13/899,567.
Ghoshal, Jagannath, et al.,"System and Method for Retrofitting a Branding Framework into a Mobile Communication Device", filed May 21, 2013, U.S. Appl. No. 13/899,566.
Advisory Action dated Dec. 17, 2014, U.S. Appl. No. 13/622,234, filed Sep. 18, 2012.
Notice of Allowance dated Nov. 22, 2014, U.S. Appl. No. 13/744,861, filed Jan. 18, 2013.
First Action Interview Pre-Interview Communication dated Oct. 22, 2014, U.S. Appl. No. 13/763,428, filed Feb. 8, 2013.
Notice of Allowance dated Dec. 29, 2014, U.S. Appl. No. 13/831,504, filed Mar. 14, 2013.
First Action Interview Pre-Interview Communication dated Nov. 20, 2014, filed May 21, 2013, U.S. Appl. No. 13/899,566.
Foreign Communication from a Related Counterpart Application, "Preliminary Report on Patentability," dated Nov. 20, 2014, PCT/US13/40278 filed on May 9, 2013.

(56) References Cited

OTHER PUBLICATIONS

Foreign Communication from a Related Counterpart—International Search Report and Written Opinion, dated Dec. 17, 2014, PCT/US14/46773, filed on Jul. 16, 2014.
Foreign Communication from a Related Counterpart—International Search Report and Written Opinion, dated Dec. 30, 2014, PCT/US14/56778, filed Sep. 22, 2014.
Spanel, Robert L., et al., Patent Application entitled "Dynamic Remotely Managed SIM Profile" U.S. Appl. No. 14/522,586, filed Oct. 24, 2014.
Urbanek, Robert E, "Delivery of Branding Content and Customizations to a Mobile Communication Device", filed Sep. 22, 2014, International Serial No. PCT/US14/56778.
Koller, Gary D., et al., "Out of the Box Experience (OOBE) Country Choice Using Wi-Fi Layer Transmission," filed Oct. 31, 2014, U.S. Appl. No. 14/530,666.
Blinn, Benjamin P., et al. "System and Method of Efficient Mobile Device Network Brand Customization," filed Sep. 2, 2014, U.S. Appl. No. 14/475,399.
First Action Interview Office Action dated Mar. 16, 2015, U.S. Appl. No. 13/468,028, filed May 9, 2013.
Office Action dated Mar. 2, 2015, U.S. Appl. No. 13/622,234, filed Sep. 18, 2012.
Faipp Pre-Interview Communication dated Mar. 26, 2015, U.S. Appl. No. 14/522,586 filed Oct. 24, 2014.
Faipp Pre-Interview Communication dated Apr. 8, 2015, U.S. Appl. No. 13/844,104, filed Mar. 15, 2013.
Notice of Allowance dated Mar. 20, 2015, U.S. Appl. No. 13/763,428, filed Feb. 8, 2013.
Notice of Allowance dated Mar. 26, 2015, U.S. Appl. No. 13/763,434, filed Feb. 8, 2013.
Notice of Allowance dated Jan. 22, 2015, U.S. Appl. No. 13/899,566, filed May 21, 2013.
Faipp Pre-Interview Communication dated Apr. 15, 2015, U.S. Appl. No. 14/060,712, filed Nov. 20, 2013.
Faipp Pre-Interview Communication dated Mar. 4, 2015, U.S. Appl. No. 14/010,518, filed Aug. 27, 2013.
Faipp Pre-Interview Communication dated Apr. 1, 2015, U.S. Appl. No. 14/010,522, filed Aug. 27, 2013.
Faipp Pre-Interview Communication dated Apr. 3, 2015, U.S. Appl. No. 14/010,523, filed Aug. 27, 2013.
Faipp Pre-Interview Communication dated Mar. 10, 2015, U.S. Appl. No. 14/010,524, filed Aug. 27, 2013.
Faipp Pre-Interview Communication dated Apr. 8, 2015, U.S. Appl. No. 14/157,507, filed Jan. 16, 2014.
Foreign Communication from a Related Counterpart—International Preliminary Report on Patentability, dated Apr. 2, 2015, PCT/US13/55023, filed on Aug. 15, 2013.
Delker, Jason R., et al. "Subscriber Identity Module (SIM) Card Initiation of Custom Application Launcher Installation on a Mobile Communication Device," filed Mar. 4, 2015, U.S. Appl. No. 14/639,056.
Delker, Jason R., et al. "Network Access Tiered Based on Application Launcher Installation," filed Mar. 4, 2015, U.S. Appl. No. 14/639,060.
Faipp Pre-Interview Communication dated Mar. 12, 2015, U.S. Appl. No. 13/972,827, filed Aug. 21, 2013.
Foreign Communication from a Related Counterpart—International Search Report and Written Opinion, dated May 19, 2014, PCT/US14/13936, filed on Jan. 30, 2014.
Foreign Communication from a Related Counterpart—International Search Report and Written Opinion, dated May 14, 2014, PCT/US14/13939, filed on Jan. 30, 2014.
First Action Interview Pre-Interview Communication dated Apr. 23, 2014, U.S. Appl. No. 13/622,234, filed Sep. 18, 2012.
First Action Interview Pre-Interview Communication dated Apr. 3, 2014, U.S. Appl. No. 13/763,434, filed Feb. 8, 2013.

* cited by examiner

LOADING BRANDED MEDIA OUTSIDE SYSTEM PARTITION

CROSS-REFERENCE TO RELATED APPLICATIONS

This application is a continuation of and claims priority under 35 U.S.C. §120 to U.S. patent application Ser. No. 13/149,505, filed on May 31, 2011, entitled "Loading Branded Media Outside System Partition", by Jason R. Delker, which is incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile virtual network operators (MVNO) are organizations that provide mobile phone services but may not have their own licensed frequency allocation of radio spectrum or the physical infrastructure required to provide wireless telephone services. Mobile virtual network operators may contract to distribute wireless services provided by telecommunications service providers that have licensed frequency and physical infrastructure. Mobile virtual network operators function as distributors of wireless services and may set their own pricing structures. The proliferation of mobile virtual network operators has been facilitated by regulatory intervention designed to lower the barriers for market entry and ultimately increase competition. Some telecommunications service providers have made strategic decisions to extend their existing operations by distributing their services to target niche or under served market segments through a second or perhaps multiple brands. Some telecommunications service providers believe that there is merit in operating a wholesale mobile virtual network operator business unit to complement their retail model. These providers have therefore either embraced mobile virtual network operator partners or launched their own branded mobile virtual network operator.

SUMMARY

In an embodiment, a portable electronic device is provided. The portable electronic device comprises a processor, a memory, and an installation application stored in the memory, that, when executed by the processor, detects stored information outside a system partition of the portable electronic device. The portable electronic device also identifies a set of files stored outside the system partition, the set of files associated with a replacement branding and containing a first instruction. The portable electronic device also installs, in response to executing the first instruction, the set of files to a first partition of the portable electronic device wherein the set of files overwrite an initial set of files associated with a first branding. In an embodiment, the detected stored information is stored in a memory card, and the set of files is stored in the memory card.

In an embodiment, a processor-implemented method is provided. The method comprises a portable electronic device receiving insertion of a physical memory card and receiving activation of power on. The method also comprises the portable electronic device executing a first firmware instruction directing reading of the memory card. The method also comprises the portable electronic device executing an application resident on the memory card causing replacement of an initial set of files resident in a data partition of the portable electronic device with a set of files from the memory card wherein the initial set of files is associated with an initial branding and the set of files is associated with a replacement branding. The method also comprises the portable electronic device rebooting and executing a second firmware instruction causing a graphic to be displayed wherein a file associated with the graphic is included in the set of files.

In an embodiment, a processor-implemented method is provided. The method comprises a portable electronic device receiving power on activation and the portable electronic device executing a first firmware instruction directing downloading a first set of files from a server. The method also comprises the portable electronic device installing the first set of files in a data partition of the portable electronic device wherein the first set of files is associated with a first branding. The method also comprises the portable electronic device rebooting and the portable electronic device executing a second firmware instruction causing a graphic to be displayed wherein a file associated with the graphic is included in the first set of files.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
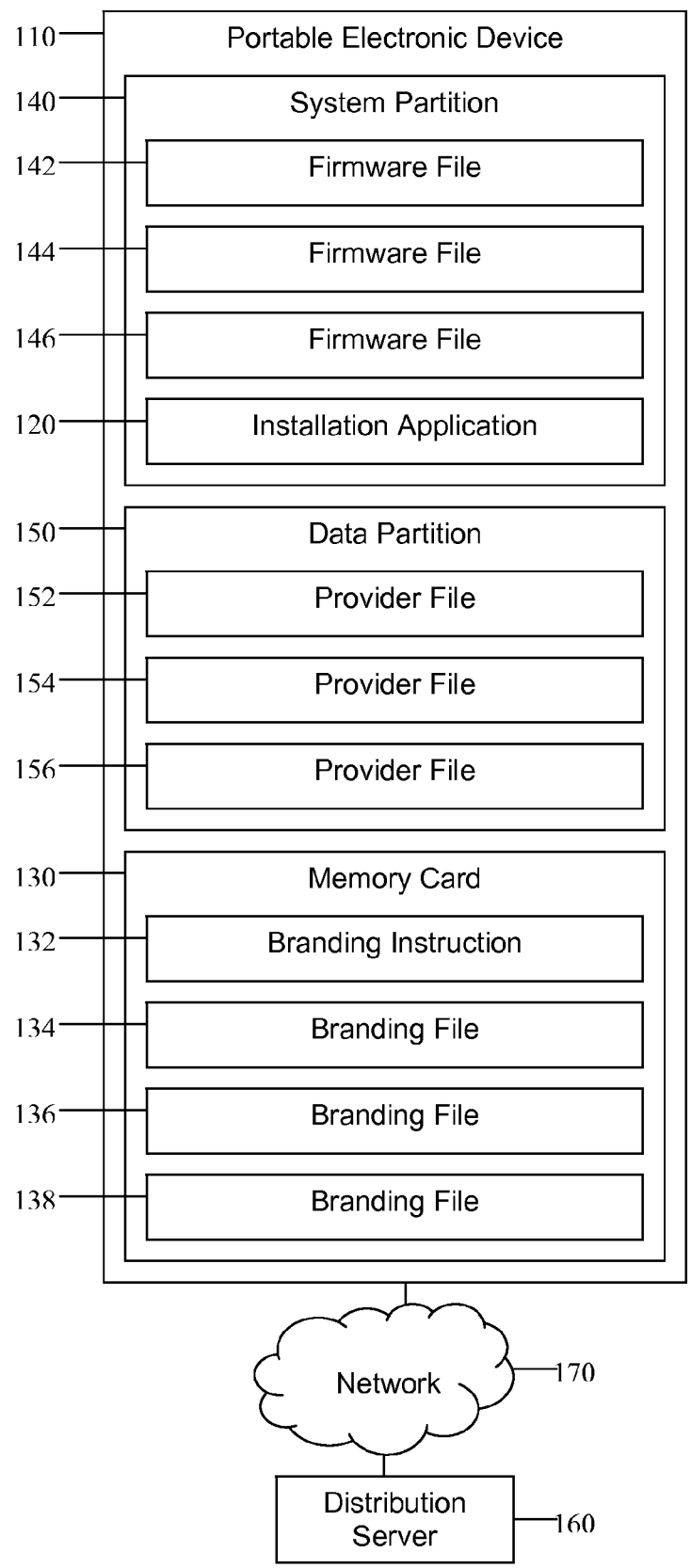
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The system and methods taught by the present disclosure promote re-branding of portable electronic devices for mobile virtual network operators (MVNO) using insertable secured digital (SD) memory cards. Files specific to the brand of a mobile virtual network operator are copied from a memory card inserted into a portable electronic device to a data partition of the device. Firmware files that enable the device's basic operation as well as implement higher-level functions, such as invoking branding applications, are stored in a system partition. Firmware files are maintained as generic and contain no references to a telecommunications service provider or the mobile virtual network operator. The firmware files point to, effectively "call", and cause activation of the branding files installed in the data partition. The branding files may comprise electronic representations of logos, ring tones, applications, customized controls and switches, and other media and settings specific to the mobile virtual network operator. The use of the memory card to deliver branding applications and other files and the making generic of some system partition files allows re-branding of devices without altering system partition files. This obviates the full re-provisioning of portable electronic devices undergoing re-branding. Because full device re-provisioning may require the use of expensive technology and specialized services, the systems and methods provided herein may promote reduced costs and enable a larger quantity of organizations to more efficiently become mobile virtual network operators.

An organization becoming a mobile virtual network operator may desire to deliver promotional information about its brands via the portable electronic devices providing wireless services. The branding of the devices may support and drive sustained user consciousness of the products and services of the mobile virtual network operator. The portable electronic devices effectively become vehicles for delivering brand information and fostering brand awareness. The operator may use the sounds and images representing its brands to sell other products not directly related to the wireless services. The operator may control transactions made with the device, including branding of electronic wallet applications accessible from the device. The operator's branding remains persistently associated with advertising, communications, and transaction fulfillment associated with the device. The operator hence influences the entire user experience. Whereas re-branding of devices from the selling telecommunications service provider previously required expensive re-provisioning including alteration of previously installed firmware applications, the present disclosure teaches the genericizing of some firmware contents and the installation of branding media from installable memory cards into the data partitions of the devices. The generic firmware originally placed in the system partition by the telecommunications service provider or original equipment manufacturer (OEM) is maintained, with pointers and links to the appropriate locations in the data partition where the branding files of the mobile virtual network operator are installed as described herein. The absence of branding references in the system partition permits re-branding without alteration of the system partition. Media associated with branding is delivered via the memory cards to the data partition of the device.

The present disclosure contemplates a storage architecture for portable electronic devices comprising at least a system partition and a data partition. The system partition may typically store firmware applications that are not frequently altered and the data partition may store applications that may be altered and replaced more easily. Such an architecture may be supported by some commercially available device operating systems, for example the Android mobile operating system. The system provided herein comprises an installation application built into the system partition of the portable electronic device that detects when a memory card is present in the device, detects when a branding instruction is stored on the card, and executes the instruction. Execution of the branding instruction causes branding files associated with the mobile virtual network operator to be copied from the card to the data partition of the device. Similar files previously written to the data partition earlier by the telecommunications service provider may be overwritten. Static references in the genericized firmware point to the newly installed branding files. In an alternate embodiment, insertable memory cards may not be used for re-branding. The installation application may instead access branding files from a server and copy them to the data partition in the manner described herein.

Turning now to FIG. 1, a system 100 is described. In an embodiment, the system 100 comprises a portable electronic device 110, an installation application 120, a memory card 130, a branding instruction 132, branding files 134, 136, 138, a system partition 140, firmware files 142, 144, 146, a data partition 150, provider files 152, 154, 156, a distribution server 160, and a network 170. The memory card 130 is insertable into and removable from the portable electronic device 110. The portable electronic device 110 may function normally without the memory card 130. The memory card 130 may be considered separate from and not a component of the portable electronic device 110. In an embodiment, the system 100 does not comprise a memory card 130.

The installation application 120 executes on the portable electronic device 110. Portable electronic devices 110 are described in detail hereinafter. The installation application 120 executes from within the system partition 140 of the portable electronic device 110. The installation application 120 executes when the portable electronic device 110 is powered on. Upon execution during power on, the installation application 120 may detect the physical presence of the memory card 130 in the portable electronic device 110. The memory card 130 may contain the branding instruction 132 and branding files 134, 136, 138 associated with a mobile virtual network operator (MVNO). The mobile virtual network operator may be re-branding the portable electronic device 110 from the telecommunications service provider that originally sold or distributed the portable electronic device 110. When the branding instruction 132 is resident on the memory card 130, the installation application 120 detects this presence and executes the branding instruction 132. The execution of the branding instruction 132 causes branding files 134, 136, 138 to be copied from the memory card 130 to the data partition 150 of the portable electronic device 110.

Alternatively, the installation application 120 may read a parameter in the data partition 150 that may contain the branding instruction 132 and/or a reference to an external source of the branding instruction 132 and the branding files 134, 136, 138. When the installation application 120 has read the parameter in the data partition 150, the installation application 120 may fetch the banding instruction 132 and/or the branding files 134, 136, 138 from the external content source. The execution of the branding instruction 132 causes the branding files 134, 136, 138 to be copied from the external content source to the data partition 150. When the installation application 120 reads a value of the parameter in the data partition 150 that is null or has some other specific value, the installation application 120 completes and exits.

When copied to the portable electronic device 110, the branding files 134, 136, 138 may overwrite and replace provider files 152, 154, 156 copied earlier to the data partition 150 of the portable electronic device 110 by the telecommunications service provider when it was originally provisioned. This process effectively re-brands the portable electronic device 110 from the telecommunications service provider to the mobile virtual network operator. As taught herein, this process is executed without the costly and technically complicated process of re-provisioning the portable electronic device 110 or altering firmware contents in the system partition 140 of the portable electronic device 110. Firmware files 142, 144, 146 made generic as taught herein link to the branding files 134, 136, 138 and call them as they previously activated the provider files 152, 154, 156. The branding files 134, 136, 138 and the provider files 152, 154, 156 are depicted in FIG. 1 as being simultaneously components of the portable electronic device 110. This depiction is for discussion purposes only. In an embodiment, the branding files 134, 136, 138 and the provider files 152, 154, 156 would be simultaneously resident in the portable electronic device 110 only when the portable electronic device 110 is awaiting re-branding that begins upon the next restart of the portable electronic device 110.

The branding files 134, 136, 138 may be provided by the mobile virtual network operator and comprise ringtones, wallpapers, applications, screensavers, and widgets associated with themes, images, trademarks, products, and services of the mobile virtual network operator. The mobile virtual network operator provides wireless communications services to its customers. It may not have its own licensed frequency allocation of radio spectrum. It may also not own physical infrastructure, for example base transceiver stations (BTS) and mobile switching centers (MSC), associated with its provision of wireless communications services. The mobile virtual network operator is analogous to a private-label provider of wireless services. When the portable electronic device 110 is initially provisioned by the telecommunications service provider that does possess radio spectrum and infrastructure, the telecommunications service provider or original equipment manufacturer installs the provider files 152, 154, 156.

The provider files 152, 154, 156, as well as subsequently the branding files 134, 136, 138, are installed in the data partition 150 of the portable electronic device 110. The data partition 150 is a portion of the memory or storage space of the portable electronic device 110 that is segregated from the system partition 140. An operating system installed and executing on the portable electronic device 110 defines the system partition 140, the data partition 150, and other partitions, if any of the memory or storage space, and further defines and enforces how and by what components the various partitions may be accessed. The present disclosure teaches that firmware files 142, 144, 146 stored in the system partition 140, that is not easily erased or modified, are generic and not specific to the telecommunications service provider, to the mobile virtual network operator, or to another party. The firmware files 142, 144, 146 invoke applications and other functionality and contain pointers or linkages to the data partition 150. The contents of the data partition 150 are more easily erased or modified. The system 100 supports that firmware files 142, 144, 146 in the system partition 140 are generic and further enforces that provider files 152, 154, 156 or branding files 134, 136, 138 such as ringtones and wallpapers, for example, that are brand-related and therefore not generic, are stored in the data partition 150.

By maintaining firmware files 142, 144, 146 as generic, this obviates the need to replace or alter the firmware files 142, 144, 146 and other components of the system partition 140 if the mobile virtual network operator becomes the retail provider of services in the place of the telecommunications service provider. By maintaining ringtones, wallpapers, and other vendor-specific or provider-specific files in the data partition 150, these files may be replaced when necessary without alteration of firmware files 142, 144, 146 in the system partition 140 that point to the provider files 152, 154, 156 or branding files 134, 136, 138 in the data partition 150. The memory card 130 may be used to deliver the mobile virtual network operator's branding files 134, 136, 138 comprising the operator's ringtones, applications, control settings, and other branded content to the portable electronic device 110. Alternatively, the branding files 134, 136, 138 may be fetched from an external content source.

The mobile virtual network operator's branding files 134, 136, 138 replace the provider files 152, 154, 156 previously placed in the data partition 150 by the telecommunications service provider. The provider files 152, 154, 156 may be the telecommunications service provider's own ringtones, wallpapers, and customized and other content. In an embodiment, the firmware files 142, 144, 146 in the system partition 140 require no alteration to accommodate the change from the telecommunications service provider to the mobile virtual network operator and the replacement of the provider files 152, 154, 156 with the branding files 134, 136, 138. The firmware files 142, 144, 146 are generic as provided herein. The firmware files 142, 144, 146 point to the location of the provider files 152, 154, 156 or the branding files 134, 136, 138, whichever are present, and causes their functionality to be called or invoked when appropriate. This process promotes the re-branding of a plurality of portable electronic devices 110 from the telecommunications service provider to the mobile virtual network operator without the need to re-provision or alter the firmware files 142, 144, 146 stored in the system partition 140.

The firmware files 142, 144, 146 enable the basic operation of the portable electronic device 110 as well as implement higher-level functions that may comprise calling or invoking functionality associated with the branding files 134, 136, 138. When an event occurs such as the portable electronic device 110 powering on or receiving an incoming voice call or short message service (SMS) message, hereinafter text message, at least one firmware file 142, 144, 146 may be invoked. Each such event is associated with some operation within the electronic circuitry of the portable electronic device 110. In many cases, this action may result in the operating system interacting with firmware files 142, 144, 146. The firmware files 142, 144, 146 may, in turn, invoke or call branding files 134, 136, 138 to produce a specific result. In the case of the portable electronic device 110 powering on, the firmware file 142 may be associated with the displaying of a splash screen wherein, for example, a corporate or organizational logo of the telecommunications service provider or mobile virtual network operator is briefly displayed. In the case of a voice call, the firmware file 144 may be activated that may in turn call the branding file 136 that plays a ringing sound or causes an audible file playing a ringing sound to be activated. When a text message is received, the firmware file 146 may be engaged by the operating system and the firmware file 146 may in turn call the branding file 138 that is associated with a vibration or buzzing action being initiated by the portable electronic device 110. The firmware files 142, 144, 146 transfer control of a procedure or subroutine to the branding files 134, 136, 138 that are associated with the procedure or subroutine specific to the displaying of the splash screen, the execution of the audible file for the ring tone, the activation of the vibratory or buzzing functionality for the text message, or other action the user sees, hears, feels, or otherwise experiences upon the occurrence of an event. The firmware files 142, 144, 146 may execute the calling or invocation of the branding files 134, 136, 138 by activating a pointer or linkage, for example a linkage using the hypertext transport protocol (HTTP).

The telecommunications service provider may sell portable electronic devices 110 and a plurality of wireless services under various subscription arrangements. The telecommunications service provider may do this on a direct retail basis using its own brand name. The telecommunications service provider may provision and program the portable electronic devices 110 to emit ringtones and other sounds, display logos and product images, and provide applications directly associated with the telecommunications service provider. These sounds, images, and applications are provided by the provider files 152, 154, 156. The sounds, images, and other media provided by telecommunications service provider in the provider files 152, 154, 156 may be created and themed with the intent of promoting the commercial interests of the telecommunications service provider. The firmware files 142, 144, 146 stored in the system partition 140 are created to be generic and therefore not specific to the telecommunications service provider or other entity. When the telecommunications service provider is the retail provider of wireless services, the firmware files 142, 144, 146 point to the provider files 152, 154, 156 resident and executing instructions from within the data partition 150. The provider files 152, 154, 156 are segregated from but invoked by the firmware files 142, 144, 146 executing generically from within the system partition 140.

The telecommunications service provider may alternatively or additionally distribute its wireless communications services on a wholesale basis. It may do this through mobile virtual network operators that may comprise a variety of different types of business organizations and other entities. The mobile virtual network operator may own little or no physical telecommunications infrastructure and may be any entity seeking to use wireless communications as a vehicle to establish and market its own brand name and image to sell its products or otherwise promote its commercial or other interests. Mobile virtual network operators may be media companies, for example cable television operators, cable content creators, or internet content providers seeking to promote their brand images and distribute some of their cable or internet content through wireless channels. They may view portable electronic devices 110 as additional outlets or end points for distribution of their content. Mobile virtual network operators may be non-profit or other non-commercial entities or other affinity groups, for example political or religious organizations seeking to distribute themed media content promoting their interests.

The system 100 and the methods described herein promote the telecommunications service provider to expand its wholesale business by building the installation application 120 into the system partition 140 of the portable electronic devices 110 it sells and encouraging mobile virtual network operators to load their branding files 134, 136, 138 onto a plurality of memory cards 130. Whereas portable electronic devices 110 might previously have had to undergo re-provisioning involving erasing some or all firmware files 142, 144, 146 in the system partition 140, the present disclosure teaches the use of insertable memory cards 130 and the installation of the branding files 134, 136, 138 specific to the mobile virtual network operator from the memory cards 130 to the more easily altered data partition 150. This process leaves the system partition 140 unaffected, making the re-branding process faster and more cost effective. The reduced cost per unit and streamlined process may allow many more prospective customers of the telecommunications service provider to become mobile virtual network operators.

Previous implementations of re-branding portable electronic devices 110 may have comprised full re-provisioning that may be an expensive, time-consuming, and technically complicated process. The portable electronic devices 110 may have to be sent to a maintenance facility wherein specialized equipment and procedures may be used. Users of portable electronic devices 110 typically cannot alter device firmware. Permitting a user to alter firmware may result in the user accidentally disabling a basic function of the portable electronic device 110, rendering the unit unusable. Re-branding of portable electronic devices for an organization becoming a mobile virtual network operator may not previously have made economic sense unless the organization was willing to bear the initial cost of re-provisioning a large quantity of units, for example a minimum of 30,000 portable electronic devices 110. Such a heavy startup cost and minimum purchase commitment may have been prohibitive for all but very large organizations. This process in many cases is more expensive and burdensome than copying a uniform set of branding files 134, 136, 138 to a plurality of uniform memory cards 130, inserting the memory cards 130 into a plurality of portable electronic devices 110, and restarting the portable electronic device 110 as taught herein. These same advantages may be obtained by use of the parameter in the data partition 150 that instructs or points to fetching branding files 134, 136, 138 from an external source as described further above.

In addition to fully re-provisioning portable electronic devices 110, organizations that previously sought to be mobile virtual network operators were often faced with building their own data networks, managing their own customer care functions, creating their own device groups, and buying their own portable electronic devices 110. These infrastructures and their associated costs often had to be built and incurred before any revenue was realized. These organizations might send the portable electronic devices 110 they purchased for distribution to fulfillment houses, firms that would re-provision the portable electronic devices 110 and load custom applications. These heavy startup costs and cumbersome ongoing management burdens significantly limited the number of organizations that could become mobile virtual network operators.

The system 100 and methods provided herein reduce the complexity and cost described above and promote a larger and broader plurality of organizations to become mobile virtual network operators. These organizations may henceforth need only provide their electronic branding media to the telecommunications service provider comprising their branded ring tones, applications, web widgets, images, and control commands, for example. The telecommunications service provider may copy the branding media to a plurality of memory cards 130 to create the branding files 134, 136, 138 that accompany the branding instruction 132. In an embodiment, the telecommunications service provider may instead store the branding files 134, 136, 138 on the distribution server 160, as discussed later. When the portable electronic devices 110 are re-branded with the branding files 134, 136, 138 of the mobile virtual network operator, the visible identity of the telecommunications service provider is completely removed from the portable electronic devices 110 and replaced by that of the mobile virtual network operator. The mobile virtual network operator then controls at least parts of the user experience including advertising, selling, billing, managing transactions, and accumulating and further using transaction and customer data.

The present disclosure teaches the decoupling of the brand associated with the portable electronic device 110 from firmware files 142, 144, 146 stored in the portable electronic device 110 that may be difficult and costly to alter. In previous implementations, some brand-specific content was stored in the system partition 140 such that when the brand associated with the portable electronic device 110 was to change, a full re-provisioning may have been necessary including erasing some or all of the contents of the system partition 140. As noted, a full re-provisioning may require the services of technical personnel at a maintenance or service center. The present disclosure teaches the storage of brand information provided by the provider files 152, 154, 156 or the branding files 134, 136, 138 exclusively in the data partition 150 with portions of the contents of the system partition 140 made generic, unaffected by any re-branding, and providing pointers to the data partition 150.

When a portable electronic device 110 is to be re-branded, the memory card 130 is inserted into the portable electronic device 110. Upon restart of the portable electronic device 110, the contents of the system partition 140 are read and the installation application 120 in the system partition 140 is executed. The installation application 120 searches for and locates the memory card 130. The installation application 120 reads the branding instruction 132. In accordance with the branding instruction 132, the installation application 120 copies the branding files 134, 136, 138 from the memory card 130 to the data partition 150, overwriting the provider files 152, 154, 156. The contents of the system partition 140 are not altered by this process. The firmware files 142, 144, 146 in the system partition 140 contain pointers to the same locations in the data partition 150 as previously. Upon a second restart, the ringtones, graphics, applications, and controls of the telecommunications service provider are replaced by those of the mobile virtual network operator and the re-branding of the portable electronic device 110 is complete.

The system 100 and methods taught herein are predicated on the architecture of the portable electronic device 110 comprising a partitioning of the storage of the portable electronic device 110 into at least two non-volatile partitions. The system partition 140 is the storage location of firmware files 142, 144, 146 that are read and processed when the portable electronic device 110 is powered on. Some or all files providing operating system functionality are installed in the system partition 140. The firmware files 142, 144, 146 and other media in the system partition 140 are intended by the telecommunications service provider that provisions the portable electronic devices 110 to remain installed there and not be removed unless the portable electronic device 110 is to be re-provisioned.

The installation application 120 is stored in the system partition 140 and executes when the portable electronic device 110 is powered on. In previous implementations, branding information for the telecommunications service provider or the mobile virtual network operator might have been stored in the system partition 140. This would have necessitated entering the system partition 140 and making alterations there in the event of re-branding, costly and time-consuming actions that may have involved a full re-provisioning of the portable electronic device 110. The system 100 and methods provided herein teach that firmware files 142, 144, 146 and other content stored in the system partition 140 are generic and not specific to the telecommunications service provider, a mobile virtual network operator, or any other party and therefore do not need to be altered in the event the portable electronic device 110 is to be re-branded.

The architecture of the portable electronic device 110 also includes the data partition 150 wherein the provider files 152, 154, 156 are initially installed by the telecommunications service provider during provisioning, the branding files 134, 136, 138 are later installed for the mobile virtual network operator by the installation application 120, and other files may be stored. While the contents of the system partition 140 may typically not be altered during general use of the portable electronic device 110, the data partition 150 is intended to contain electronic contents that are specific to the telecommunications service provider or the mobile virtual network operator. These files are more easily altered and deleted because they are allowed by the operating system to be more readily accessible. These files contain the ringtones, graphics, applications, control files, and other media specific to the telecommunications service provider or the mobile virtual network operator that permit the branding of these entities to be displayed.

The provider files 152, 154, 156 and the branding files 134, 136, 138 may be associated with applications that do not execute unless invoked by some component. In many cases, the invoking component is one or more of the firmware files 142, 144, 146 that contain linkages or pointers to one or more of the provider files 152, 154, 156 or the branding files 134, 136, 138. The firmware files 142, 144, 146 are intended to be indifferent about whether they are pointing to or linking to and therefore invoking the provider file 152 or the branding file 134. The firmware files 142, 144, 146 execute generic instructions for an action such as displaying a graphic and their execution may involve accessing content, such as a graphic file, located via a link, at some location on the data partition 150. The firmware files 142, 144, 146 do not "know" whether the content they are accessing on the data partition 150 and causing execution of is associated with the telecommunications service provider or the mobile virtual network operator.

The firmware files 142, 144, 146 may generally be associated with operating system actions and control commands such as playing a sound such as a ring tone, displaying a graphic such as a splash screen, or causing an application to be invoked, each action initiated upon an operating system or other firmware command. These actions may be originated in connection with some user action, a message received from an external device, or other event. Whereas a splash screen of the telecommunications service provider may be displayed upon a certain action or event prior to re-branding of the portable electronic device 110, a splash screen or other graphic of the mobile virtual network operator would be displayed after re-branding upon the occurrence of the same action or event. The firmware file 142 or files 142, 144, 146 associated with the invoked operating system command or other action follow pointers or links to the one of provider files 152, 154, 156 and branding files 134, 136, 138 for the media to sound, display, or otherwise execute. The directory structure of the data partition 150 is not changed by the re-branding taught herein. The branding files 134, 136, 138 are copied into the same directory structure wherein the provider files 152, 154, 156 were previously stored.

The present disclosure teaches the segregation of firmware files 142, 144, 146 and the one of provider files 152, 154, 156 and branding files 134, 136, 138 in separate non-volatile storage partitions. In the system 100, this separation is persistent and is established and maintained at an operating system level. A commercially available mobile device operating system, such as the Android mobile operating system, may provide for such separation of the system partition 140 and the data partition 150. The present disclosure effectively enables re-branding of the portable electronic device 110 running Android and similar operating systems outside the system partition 140, in preferred embodiments using the branding files 134, 136, 138 copied to the data partition 150 by the installation application 120.

In an embodiment, the memory card 130 is a secure digital (SD) non-volatile memory card with a memory format developed for use in portable electronic devices 110. A variety of memory cards 130 are used in mobile telephones, digital cameras, electronic book readers, tablet computers, notebook computers, media players, global positioning system (GPS) receivers, and video game consoles. The memory card 130 is inserted into a slot of the portable electronic device 110. The branding instruction 132 and the branding files 134, 136, 138 are stored on the memory card 130. In an embodiment, the branding instruction 132 and the branding files 134, 136, 138 may be installed, for example at a centralized distribution center, on a large plurality of instances of memory cards 130 for use in re-branding hundreds or thousands of portable electronic devices 110.

Whenever the portable electronic device 110 is powered on, the installation application 120, that resides and executes from the system partition 140, searches for the memory card 130, and if found, searches for the branding instruction 132 on the memory card 130. The presence of the branding instruction 132 indicates that the portable electronic device 110 is to be re-branded. When the installation application 120 finds the memory card 130 and then finds the branding instruction 132 on the memory card 130, the installation application 120 executes the branding instruction 132. The branding instruction 132 causes the installation application 120 to copy the branding files 134, 136, 138 from the memory card 130 to the data partition 150. The installation application 120 copies the branding files 134, 136, 138 into the directory structure in which the provider files 152, 154, 156 presently reside, a process that may overwrite the provider files 152, 154, 156. This allows the pointers and links accessed by the firmware files 142, 144, 146 to correctly call the branding files 134, 136, 138 desired to execute operations associated with the alternative brand.

While much of the discussion to this point has focused on the branding files 134, 136, 138 overwriting the provider files 152, 154, 156 or a previous set of branding files 134, 136, 138 during a re-branding, in an embodiment some of the contents of the data partition 150 may not be overwritten and may survive the re-branding. Some addressing and other contents may be cached within the data partition 150. The contents of the data partition 150 need not be fully deleted by the installation application 120. When the firmware file 142 is invoked by the operating system or other component and the firmware file 142 calls the branding file 134, the firmware file 142 accesses a memory address in the data partition 150. The memory address accessed may contain the branding file 134 such that the addressing to the branding file 134 is direct. The present disclosure also provides for indirect addressing wherein the firmware file 142 points to a memory address in the data partition 150 that instead of containing the branding file 134 contains a pointer to the address of another memory location in the data partition where the branding file 134 is located. Indirect addressing may be used in a plurality of instances. The request to sound ring tone associated with an incoming voice call may activate the firmware file 142. The firmware file 142 may invoke a pointer or link that accesses a memory address in the data partition 150. The memory address may point to a second memory address wherein the desired branding file 134 is located and may be executed to play the ring tone.

The copying of branding files 134, 136, 138 may thus not overwrite all of the contents of the data partition 150 and may instead revise some of the contents of memory addresses in the data partition 150 to which the firmware files 142, 144, 146 persistently point. This kind of indirect addressing promotes leaving firmware files 142, 144, 146 unaltered and intact during re-brandings such that the addresses to which firmware files 142, 144, 146 point are not changed. There may be differences between individual sets of branding files 134, 136, 138 and provider files 152, 154, 156 such that the storage of the branding files 134, 136, 138 do not fit ideally into the directory structure wherein the provider files 152, 154, 156 previously were stored. The use of indirect addressing and pointers within the data partition 150 may permit these differences. The components of the system 100 may be configured at the outset to provide for one of direct addressing and indirect addressing.

Once the branding files 134, 136, 138 are copied from the memory card 130 to the portable electronic device 110, the branding instruction 132 may be deleted. The memory card 130 may be erased of other stored electronic media and thenceforth provide general memory for the portable electronic device 110. In an embodiment, the memory card 130 may be physically removed from the portable electronic device 110. Once erased, the memory card 130 may subsequently be reused to re-brand another plurality of portable electronic devices 110. As noted, whenever the portable electronic device 110 is powered on, the contents of the system partition 140 are read. This includes the installation application 120. When the installation application 120 executes and searches for and either finds the memory card 130 without the branding instruction 132 or does not find the memory card 130 at all, the installation application 120 ends. In an embodiment, the installation application 120 may be disabled after re-branding, thus preventing a second or subsequent re-branding and also preventing unauthorized manipulation of controls or other elements of the mobile operating system. In an embodiment, the installation application 120 may contain logic to permit only a single re-branding such that subsequent use of the installation application 120 is prevented.

In an embodiment, the system 100 and methods described herein may be used when the portable electronic device 110 has not previously been loaded with provider files 152, 154, 156 by the telecommunications service provider and the portable electronic device 110 is effectively in an "out of the box" condition. Once provisioned and provided with network access identifiers (NAI), a plurality of portable electronic devices 110 could be packaged and shipped. Memory cards 130 containing the branding instruction 132 and branding files 134, 136, 138 associated with a plurality of different telecommunication service providers or mobile virtual network operators may be shipped along with the portable electronic devices 110, for example in a separate box or carton on a palate with a plurality of master cartons of portable electronic devices 110. The party receiving the portable electronic devices 110 may be a retailer or distributor and may prepare the portable electronic devices 110 for end user customers that may be subscribing for wireless services from any one of a plurality of mobile virtual network operators. When the portable electronic devices 110 are removed from the packaging provided by the telecommunications service provider and powered on, the network access identifier (NAI) for each portable electronic device 110 is read and may alert the retailer or distributor of the mobile virtual network operator to be associated with the portable electronic device 110.

The retailer or distributor will choose the memory card 130 associated with the appropriate mobile virtual network operator, insert it, and restart the portable electronic device 110. The branding process will then take place automatically as described herein with the installation application 120 locating and loading the branding files 134, 136, 138 on the memory card. The retailer or distributor may then repackage the fully ready to use portable electronic device 110 for its shipment to the end user. The retailer or distributor may perform this service for many thousands of portable electronic devices 110 and for scores of different mobile virtual network operators. It is understood that one memory card 130 may be used to brand a plurality of the portable electronic devices 110. For example, if 10,000 portable electronic devices 110 are being branded for a particular mobile virtual network operator, 100 memory cards may be used to successively brand the 10,000 portable electronic devices in a series of 100 steps (one step per phone) in 100 parallel branding processes.

In an embodiment, the process described in the previous paragraph may take place without the use of memory cards 130. The branding files 134, 136, 138 may instead be delivered from the distribution server 160 associated with the telecommunications service provider, the mobile virtual network operator, or a retailer or distributor acting on behalf of these parties. The distribution server 160 is a computer system. Computer systems are described in detail hereinafter. An organization seeking to become a mobile virtual network operator may deliver its branded media to the telecommunications service provider. Instead of creating the branding files 134, 136, 138 from the media and placing them on a plurality of memory cards 130, the telecommunications service provider places the branding files 134, 136, 138 on the distribution server 160. The portable electronic devices 110 may then wirelessly download the branding files 134, 136, 138 from the distribution server 160 or may be physically docked to a device connected to the distribution server 160.

In an embodiment, the telecommunications service provider may create the branding files 134, 136, 138 from the digital media received from the organization becoming the mobile virtual network operator and furnish the branding files 134, 136, 138 to a retailer or distributor of portable electronic devices 110 and/or wireless services. The retailer or distributor may load the branding files 134, 136, 138 on its distribution server 160 for subsequent installation on a plurality of portable electronic devices 110 to be distributed on behalf of the mobile virtual network operator. In an embodiment, the telecommunications service provider may create the branding files 134, 136, 138 and provide them to the mobile virtual network operator that may use its own distribution server 160 to copy the branding files 134, 136, 138 to the plurality of portable electronic devices 110.

In an embodiment, a second mobile virtual network operator may take over or replace a first mobile virtual network operator such that portable electronic devices 110 are re-branded from the first to the second mobile virtual network operator. In this case, memory cards 130 may be created with the branding files 134, 136, 138 of the second mobile virtual network operator. This discussion assumes that the portable electronic devices 110 were previously provided the installation application 120 installed in the system partition 140 and the firmware files 142, 144, 146 made generic and pointing or linking to the data partitions 150 as described herein. Once the memory cards have been created with the branding files 134, 136, 138 of the second mobile virtual network operator and provided the branding instruction 132, they may be inserted into the portable electronic devices 110. The portable electronic devices 110 may then be restarted. The installation application 120 in each portable electronic device 110 detects the memory cards 130 and copies the branding files 134, 136, 138 from the memory cards to the data partitions 150. In this case, instead of the branding files 134, 136, 138 overwriting the provider files 152, 154, 156 of the telecommunications service provider, the branding files 134, 136, 138 of the second mobile virtual network operator are overwriting the branding files 134, 136, 138 of the first mobile virtual network operator.

In an embodiment, the branding files 134, 136, 138 may be stored on the memory card 130 and/or on the distribution server 160 and thereafter in the data partition 150 of the portable electronic device 110 in a hidden or encrypted fashion. This may protect the security of the branding files 134, 136, 138 and may also prevent the accidental or intentional deletion or alteration of the branding files 134, 136, 138. The installation application 120 contains functionality to decrypt the branding files 134, 136, 138 if necessary.

The components of the system 100 and the methods provided herein may also be used when the telecommunications service provider or mobile virtual network operator is not re-branding the portable electronic device 110 but rather wishes to update or refresh branded content stored in the data partition 150 as provider files 152, 154, 156 or branding files 134, 136, 138, respectively. The mobile virtual network operator may have received in returns or exchanges some older portable electronic devices 110 that were branded for the mobile virtual network operator but wherein a logo, for example, of the mobile virtual network operator has been updated. In an embodiment, the mobile virtual network operator may have been taken over by another company and its logos and other branding media may have changed. When the mobile virtual network operator receives the older portable electronic devices 110 back, it may update the logos and other branding media that are stored in the data partition 150 as branding files 134, 136, 138. It may do this through the use of memory cards 130 or by receiving the updated media from the distribution server 160. In this embodiment, the portable electronic devices 110 are not being re-branded wherein the mobile virtual network operator is taking over from the telecommunications service provider or from a previous mobile virtual network operator. The branded media is merely being refreshed so current versions of the media may be displayed.

In an embodiment, there may be no mobile virtual network operator involved in the interactions of the components of the system 100. The organization selling or distributing the portable electronic devices 110 may seek to refresh branded electronic material for any of a plurality of reasons that are unrelated to one organization taking over control of the portable electronic devices 110 from another organization. The actions of the mobile virtual network operator are illustrative of a preferred embodiment of the teachings provided herein but do not comprise the only application of these components.

The portable electronic device 110 may be a mobile telephone, a personal digital assistant (PDA), or a media player. While only one portable electronic device 110 is depicted in FIG. 1, it is understood that a plurality of portable electronic devices 110 are existent and active in the system 100. The network 170 promotes communication between the components of the system 100. The network 170 may be any communication network including a public data network (PDN), a public switched telephone network (PSTN), a private network, and/or a combination.

Figure 2:
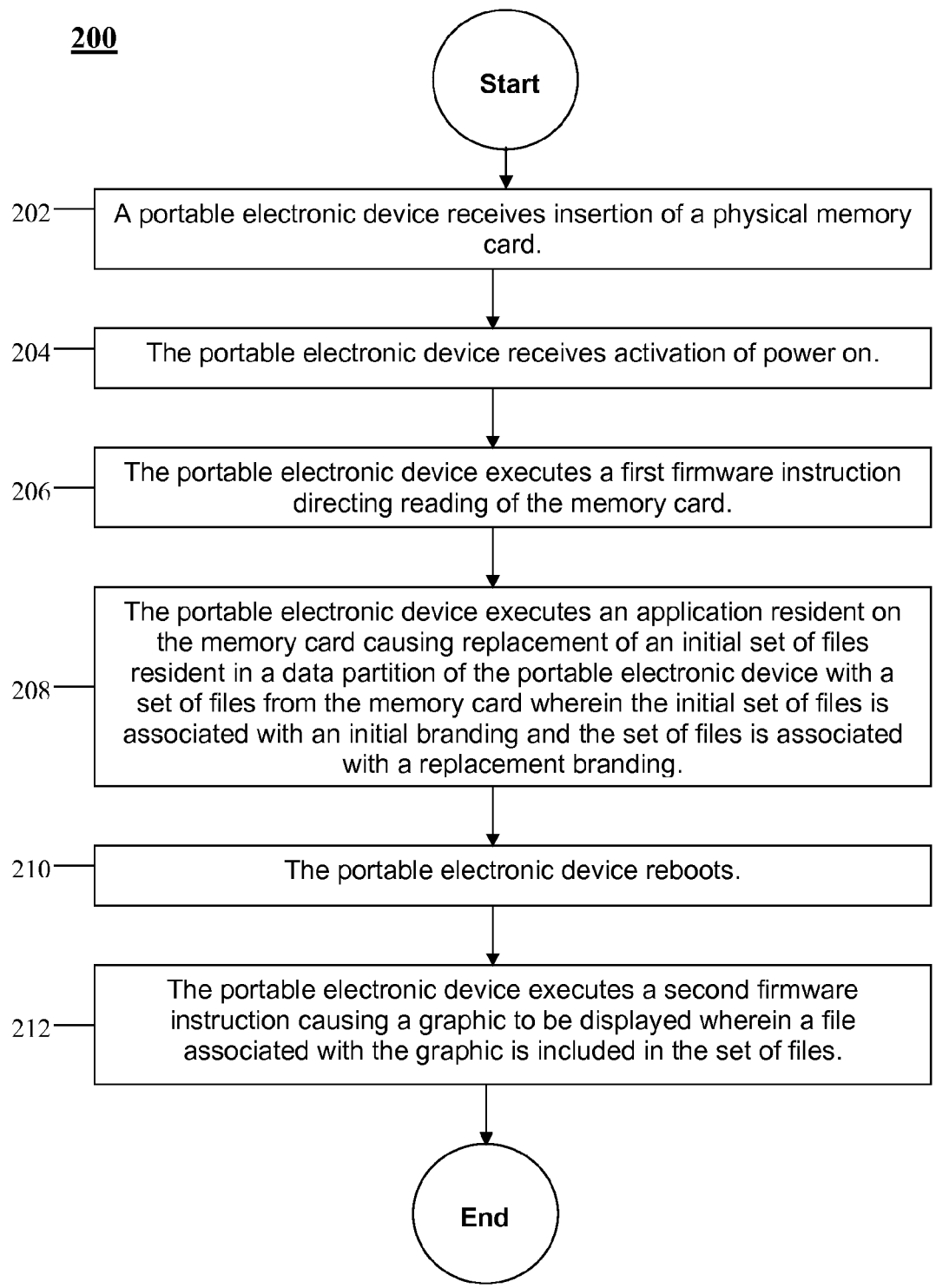
FIG. 2 is a flow chart illustrating a method according to an embodiment of the disclosure.

Turning now to FIG. 2, a processor-implemented method 200 is provided. The method 200 describes the embodiment outlined previously wherein a second mobile virtual network operator may be replacing a first mobile virtual network operator. The portable electronic device 110 may have already been in use by a subscriber of the first mobile virtual network operator and is therefore being re-branded.

At block 202, a portable electronic device receives insertion of a physical memory card. The portable electronic device is the portable electronic device 110 provided in the system 100 and the memory card is the memory card 130 provided in the system 100. The memory card 130 may be inserted into the portable electronic device 110 by the second mobile virtual network operator that is taking over the portable electronic device 110 or by the telecommunications service provider, a retailer, or a distributor performing the re-branding services.

At block 204, the portable electronic device receives activation of power on. At block 206, the portable electronic device executes a first firmware instruction directing reading of the memory card 130. The first firmware instruction is provided by the installation application 120 that directs it to search for the memory card 130 and read its contents.

At block 208, the portable electronic device 110 executes an application resident on the memory card 130 causing replacement of an initial set of files resident in a data partition of the portable electronic device 110 with a set of files from the memory card 130 wherein the initial set of files is associated with an initial branding and the set of files is associated with a replacement branding. The application referred to at block 208 is the branding instruction 132. The installation application 120, by finding and processing the branding instruction 132, copies the branding files 134, 136, 138 from the memory card 130 to the data partition 150. This process replaces the branding files 134, 136, 138 previously stored in the data partition 150 and associated with the first mobile virtual network operator that is being replaced by the second mobile virtual network operator. While bearing the same component designation in this discussion, the branding files 134, 136, 138 of the second mobile virtual network operator are different from the branding files 134, 136, 138 of the first mobile virtual network operator.

At block 210, the portable electronic device reboots. At block 212, the portable electronic device executes a second firmware instruction causing a graphic to be displayed wherein a file associated with the graphic is included in the set of files. The graphic is associated with the second mobile virtual network operator that has taken over the portable electronic device 110. The second firmware instruction is associated with the firmware file 142 in the system partition 140 that points or links to the same location in the data partition 150 as it did prior to the re-branding described in the method 200. Whereas before the re-branding the graphic file may have displayed a logo, splash screen, product image, or other visual object associated with the first mobile virtual network operator, after the re-branding described herein, the graphic file now displays the logo, splash screen, product image or other visual object associated with the new or second mobile virtual network operator. The firmware files 142, 144, 146 in the system partition 140 have not been altered and continue to function in the same manner as previously.

Figure 3:
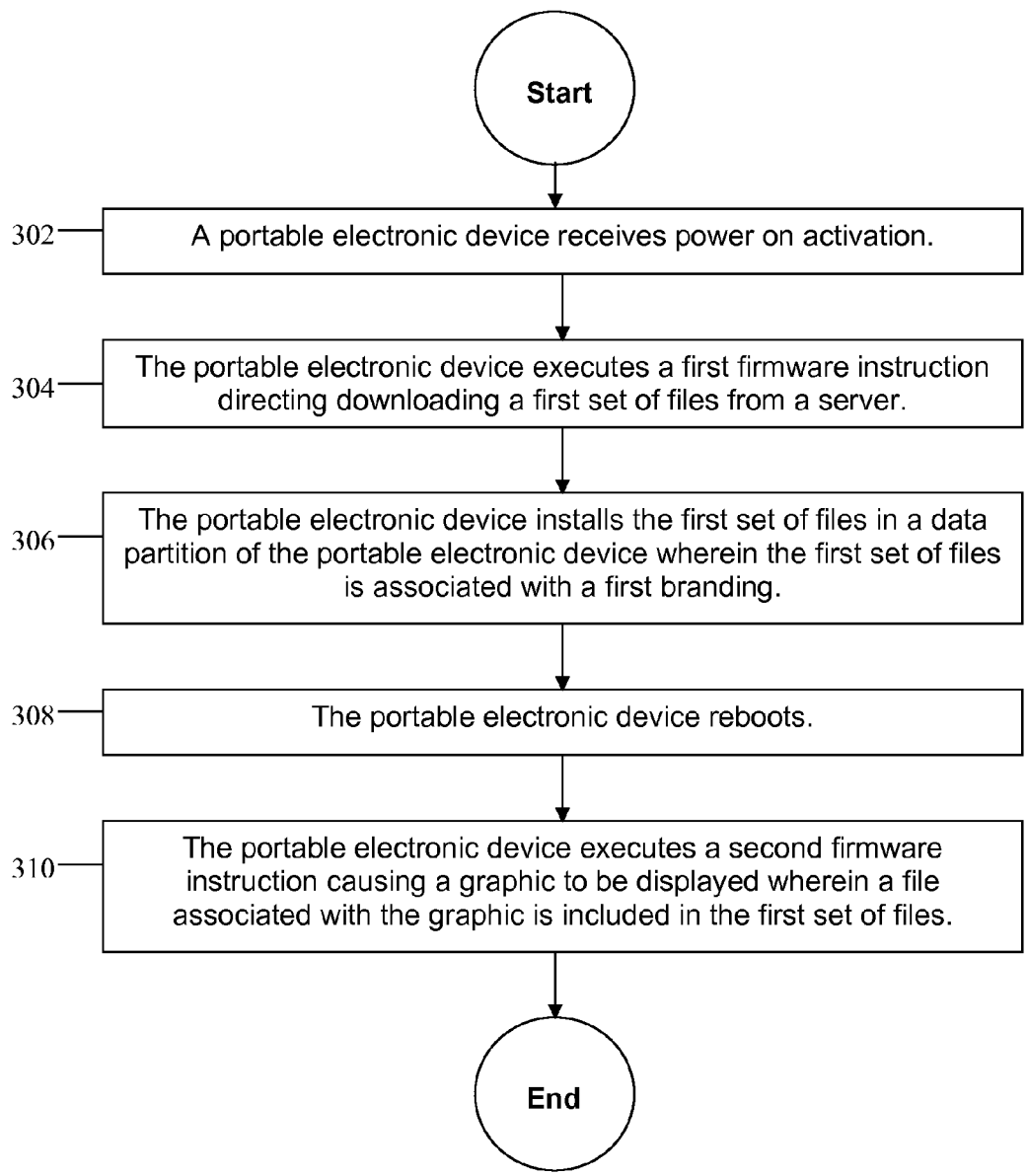
FIG. 3 is a flow chart illustrating a method according to an embodiment of the disclosure.

Turning now to FIG. 3, a processor-implemented method 300 is provided. The method 300 describes an embodiment wherein branding files 134, 136, 138 are obtained from a source other than the memory card 130. As discussed previously, the distribution server 160 may be a repository of a plurality of instances of the branding files 134, 136, 138 and may distribute them to a plurality of portable electronic devices.

At block 302, a portable electronic device, that in the system 100 is the portable electronic device 110, receives power on activation. At block 304, the portable electronic device 110 executes a first firmware instruction directing downloading of a first set of files from a server. The first set of files comprises the branding files 134, 136, 138. The first firmware instruction in the method 300 originates from the installation application 120. While much of the discussion herein about the actions of the installation application 120 have centered on the installation application 120 searching for the memory card 130, and if found, searching the memory card 130 for the branding instruction 132, the installation application 120 may be configured to alternatively or additionally search for a distribution point associated with a different component, for example the distribution server 160. The distribution server 160 may be operated by the telecommunications service provider, the mobile virtual network operator, or a retailer or distributor of portable electronic devices 110 and/or wireless services.

At block 306, the portable electronic device installs the first set of files in a data partition of the portable electronic device wherein the first set of files is associated with a first branding. The installation application 120 installs the newly received branding files 134, 136, 138 in the data partition 150 of the portable electronic device 110.

At block 308, the portable electronic device reboots. At block 310, the portable electronic device executes a second firmware instruction causing a graphic to be displayed wherein a file associated with the graphic is included in the first set of files. The second firmware instruction is associated with a firmware file 142. The graphic displayed may be a logo, splash screen, product image, or other visual object associated with the mobile virtual network operator that is branding the portable electronic device 110.

Figure 4:
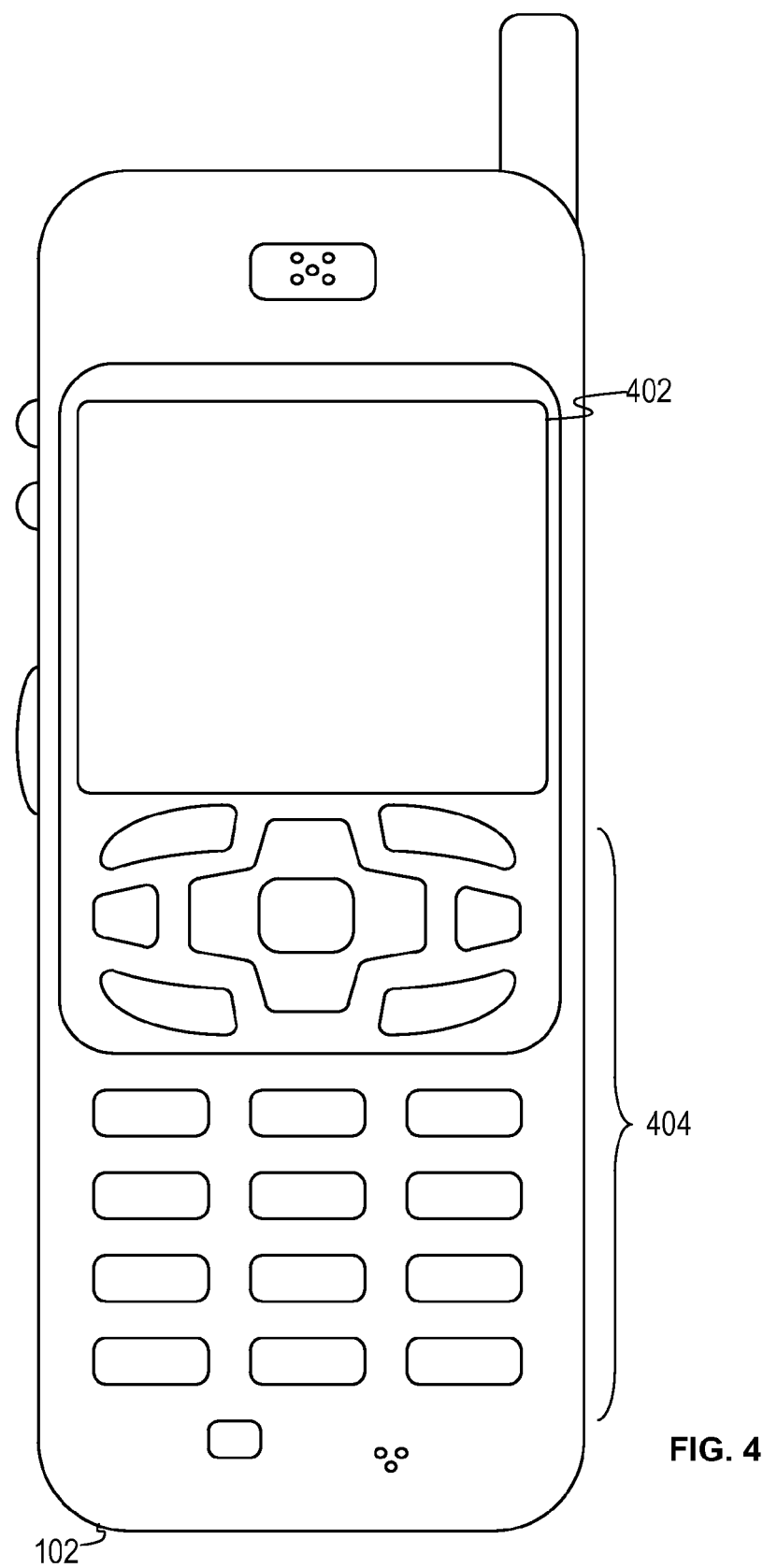
FIG. 4 is an illustration of a mobile device according to an embodiment of the disclosure.

FIG. 4 shows a wireless communications system including the mobile device 102. FIG. 4 depicts the mobile device 102, which is operable for implementing aspects of the present disclosure, but the present disclosure should not be limited to these implementations. The mobile device 102 may in some embodiments exemplify the portable electronic device 110 described in the system 100. Though illustrated as a mobile phone, the mobile device 102 may take various forms including a wireless handset, a pager, a personal digital assistant (PDA), a gaming device, an inventory control device, a media player, a digital camera, a digital calculator, a portable computer, a tablet computer, a laptop computer, and/or other. Many suitable handsets combine some or all of these functions. In some embodiments of the present disclosure, the mobile device 102 is not a general purpose computing device like a portable, laptop or tablet computer, but rather is a special-purpose communications device such as a mobile phone, wireless handset, pager, or PDA. The mobile device 102 may support specialized activities such as gaming, inventory control, job control, and/or task management functions, and so on.

The mobile device 102 includes a display 402 and a touch-sensitive surface and/or keys 404 for input by a user. The mobile device 102 may present options for the user to select, controls for the user to actuate, and/or cursors or other indicators for the user to direct. The mobile device 102 may further accept data entry from the user, including numbers to dial or various parameter values for configuring the operation of the handset. The mobile device 102 may further execute one or more software or firmware applications in response to user commands. These applications may configure the mobile device 102 to perform various customized functions in response to user interaction. Additionally, the mobile device 102 may be programmed and/or configured over-the-air, for example from a wireless base station, a wireless access point, or a peer mobile device 102.

Figure 5:
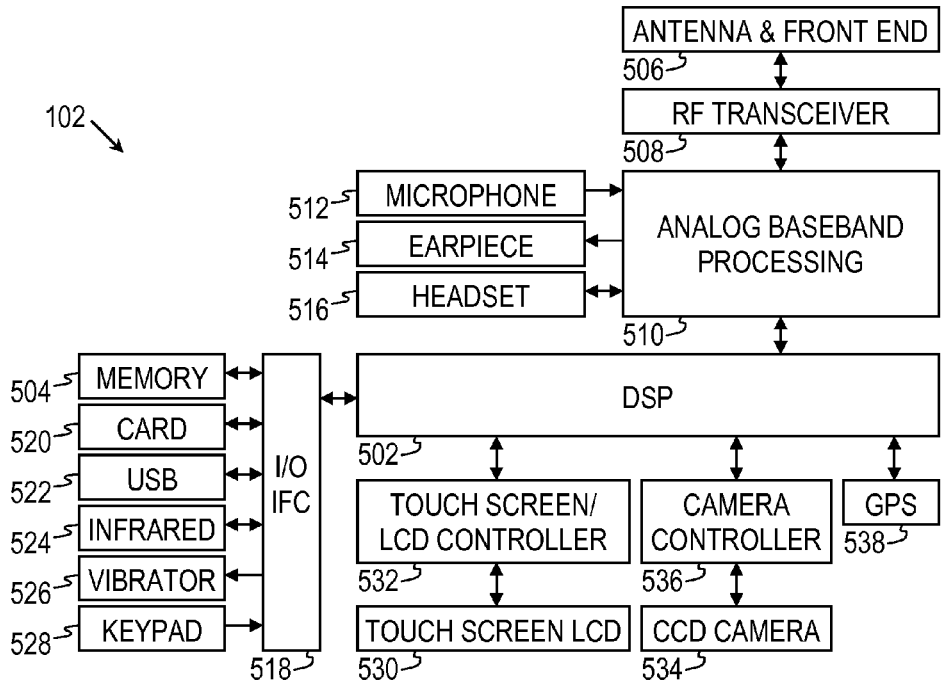
FIG. 5 is a block diagram of a mobile device according to an embodiment of the disclosure.

FIG. 5 shows a block diagram of the mobile device 102. While a variety of known components of handsets 102 are depicted, in an embodiment a subset of the listed components and/or additional components not listed may be included in the mobile device 102. The mobile device 102 includes a digital signal processor (DSP) 502 and a memory 504. As shown, the mobile device 102 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the mobile device 102 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the mobile device 102 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 102 to send and receive information from a radio access network (RAN) or some other available wireless communications network or from a peer mobile device 102. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the mobile device 102 to be used as a mobile phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 102 to function as a peripheral device to exchange information with a personal computer or other computer system. The infrared port 524 and other optional ports such as a BLUETOOTH interface or an IEEE 802.11 compliant wireless interface may enable the mobile device 102 to communicate wirelessly with other nearby handsets and/or wireless base stations.

The input/output interface 518 may further connect the DSP 502 to the vibrator 526 that, when triggered, causes the mobile device 102 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the mobile device 102. Another input mechanism may be the touch screen LCD 530, which may also display text and/or graphics to the user. The touch screen LCD controller 532 couples the DSP 502 to the touch screen LCD 530.

The CCD camera 534 enables the mobile device 102 to take digital pictures. The DSP 502 communicates with the CCD camera 534 via the camera controller 536. The GPS sensor 538 is coupled to the DSP 502 to decode global positioning system signals, thereby enabling the mobile device 102 to determine its position. In another embodiment, a camera operating according to a technology other than charge coupled device cameras may be employed. Various other peripherals may also be included to provide additional functions, e.g., radio and television reception.

Figure 6:
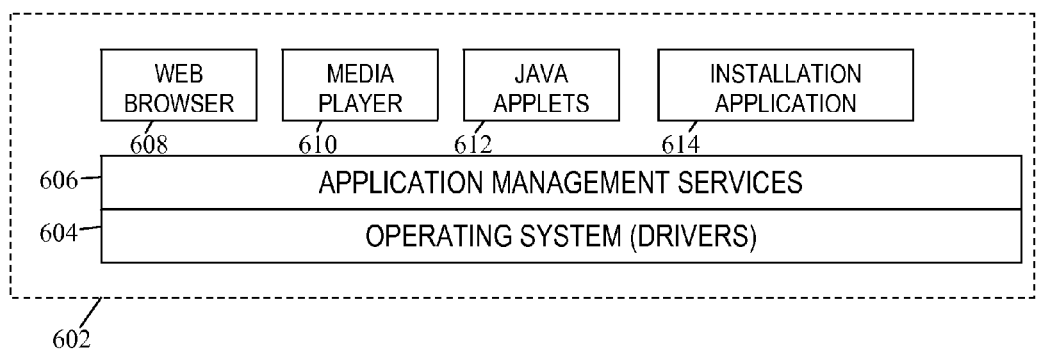
FIG. 6 is a block diagram of a software architecture for a mobile device according to an embodiment of the disclosure.

FIG. 6 illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services ("AMS") 606 that transfer control between applications running on the mobile device 102. Also shown in FIG. 6 are a web browser application 608, a media player application 610, and JAVA applets 612. The web browser application 608 configures the mobile device 102 to operate as a web browser, allowing a user to enter information into forms and select links to retrieve and view web pages. The media player application 610 configures the mobile device 102 to retrieve and play audio or audiovisual media. The JAVA applets 612 configure the mobile device 102 to provide games, utilities, and other functionality. The installation application 614 may correspond to the installation application 120 provided by the system 100.

Figure 7:
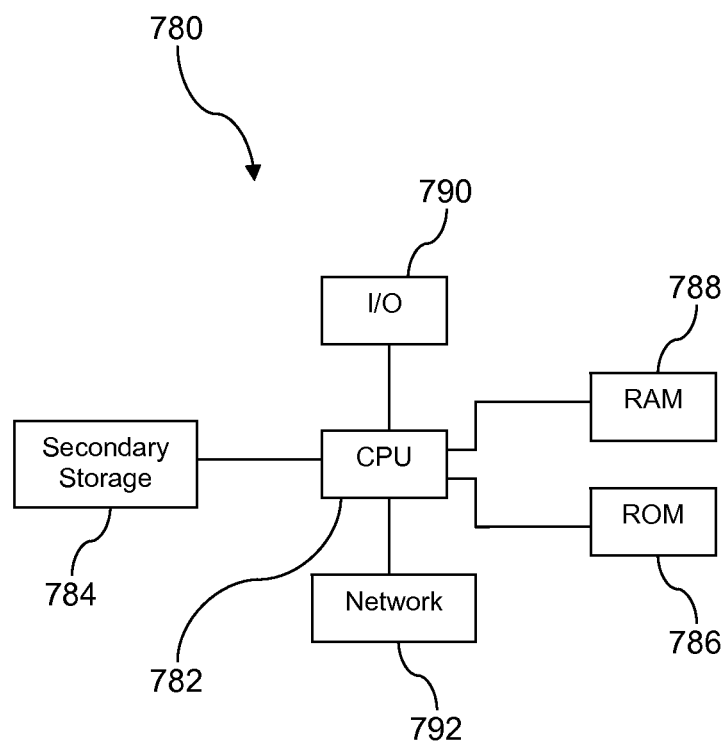
FIG. 7 illustrates an exemplary computer system suitable for implementing some aspects of the several embodiments of the disclosure.

FIG. 7 illustrates a computer system 780 suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

It is understood that by programming and/or loading executable instructions onto the computer system 780, at least one of the CPU 782, the RAM 788, and the ROM 786 are changed, transforming the computer system 780 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784. The secondary storage 784, the RAM 788, and/or the ROM 786 may be referred to in some contexts as computer readable storage media and/or non-transitory computer readable media.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 792 may enable the processor 782 to communicate with the Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in an optical conduit, for example an optical fiber, or in the air or free space. The information contained in the baseband signal or signal embodied in the carrier wave may be ordered according to different sequences, as may be desirable for either processing or generating the information or transmitting or receiving the information. The baseband signal or signal embodied in the carrier wave, or other types of signals currently used or hereafter developed, may be generated according to several methods well known to one skilled in the art. The baseband signal and/or signal embodied in the carrier wave may be referred to in some contexts as a transitory signal.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 784, for example, hard drives, floppy disks, optical disks, and/or other device, the ROM 786, and/or the RAM 788 may be referred to in some contexts as non-transitory instructions and/or non-transitory information.

In an embodiment, the computer system 780 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 780 to provide the functionality of a number of servers that is not directly bound to the number of computers in the computer system 780. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 780, at least portions of the contents of the computer program product to the secondary storage 784, to the ROM 786, to the RAM 788, and/or to other non-volatile memory and volatile memory of the computer system 780. The processor 782 may process the executable instructions and/or data structures in part by directly accessing the computer program product, for example by reading from a CD-ROM disk inserted into a disk drive peripheral of the computer system 780. Alternatively, the processor 782 may process the executable instructions and/or data structures by remotely accessing the computer program product, for example by downloading the executable instructions and/or data structures from a remote server through the network connectivity devices 792. The computer program product may comprise instructions that promote the loading and/or copying of data, data structures, files, and/or executable instructions to the secondary storage 784, to the ROM 786, to the RAM 788, and/or to other non-volatile memory and volatile memory of the computer system 780.

In some contexts, a baseband signal and/or a signal embodied in a carrier wave may be referred to as a transitory signal. In some contexts, the secondary storage 784, the ROM 786, and the RAM 788 may be referred to as a non-transitory computer readable medium or a computer readable storage media. A dynamic RAM embodiment of the RAM 788, likewise, may be referred to as a non-transitory computer readable medium in that while the dynamic RAM receives electrical power and is operated in accordance with its design, for example during a period of time during which the computer 780 is turned on and operational, the dynamic RAM stores information that is written to it. Similarly, the processor 782 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A portable electronic device, comprising:
   at least one processor;
   a non-transitory data memory partition comprising a location associated with one of a plurality of sets of files, the plurality of sets of files includes an initial set of files that is stored at the location prior to installation of a replacement set files, wherein the replacement set of files comprises a branding or re-branding set of files associated with branding or rebranding the portable electronic device with a service provider brand of a service provider;
   a non-transitory system memory partition storing:
      at least one pointer or linkage to the location in the non-transitory data memory partition, and
      generic firmware that points to the location in the non-transitory data memory partition to invoke branding or re-branding the portable electronic device without altering the generic firmware or re-provisioning the portable electronic device; and an installation application stored in the non-transitory system memory partition that, when executed by the at least one processor,
  detects a memory card that is communicatively coupled with the portable electronic device and that includes an instruction to invoke either branding or re-branding of the portable electronic device,
  responsive to detection of the memory card, receives the replacement set files from at least one of the memory card or a server based on the instruction,
  installs, in response to the receiving, the replacement set of files at the location in the non-transitory data memory partition, wherein the installation is configured to overwrite the initial set of files stored at the location of the non-transitory data memory partition, and
  brands or re-brands the portable electronic device to the service provider brand without re-provisioning or altering the generic firmware based on the generic firmware invoking the replacement set of files at the location in the non-transitory data memory partition.

2. The portable electronic device of claim 1, wherein the installation application is executed responsive to a trigger event detected by the portable electronic device, wherein the trigger event includes power on of the portable electronic device.

3. The portable electronic device of claim 1, wherein the non-transitory system memory partition is segregated from the non-transitory data memory partition.

4. The portable electronic device of claim 1, wherein the portable electronic device brands or re-brands by restarting and executing the generic firmware subsequent to installation of the set of branding files.

5. The portable electronic device of claim 1, wherein execution of the generic firmware activates the at least one pointer or linkage to the location storing one of the initial set of files or the replacement set of files.

6. The portable electronic device of claim 1, wherein the initial set of files and the replacement set of files comprise separate sets of ringtones, wallpapers, apps, screensavers, and widgets.

7. The portable electronic device of claim 1, wherein the initial set of files is associated with a telecommunications services provider, and wherein the replacement set of files is associated with a mobile virtual network operator (MVNO).

8. The portable electronic device of claim 1, wherein after the replacement set of files is installed to the non-transitory data memory partition, electronic files associated with the initial set of files or replacement set of files remaining on the memory card are erased and the memory card provides general memory to the portable electronic device.

9. The portable electronic device of claim 1, wherein the memory card is a secure digital (SD) card.

10. A processor-implemented method of branding or re-branding a portable electronic device, comprising:
  receiving, by the portable electronic device executing at least one processor, a detection of a physical memory card that is communicatively coupled with the portable electronic device and that includes a branding or re-branding firmware instruction to respectively invoke either branding or re-branding of the portable electronic device;
  activating, by the portable electronic device, generic firmware stored in a non-transitory system memory partition of the portable electronic device responsive to the portable electronic device being powered on, wherein the generic firmware uses at least one pointer or linkage to point to a location in a non-transitory data memory partition of the portable electronic device to invoke either an initial set of files or a replacement set of files, and wherein the replacement set of files comprises a branding or re-branding set of files associated with branding or re-branding the portable electronic device with a service provider brand of a service provider;
  executing, by the portable electronic device, a reading firmware instruction that directs a generic firmware reading of the branding or re-branding firmware instruction of the memory card;
  based on the branding or re-branding firmware instruction, replacing, by the portable electronic device executing an application resident on the memory card, the initial set of files resident in the location of the non-transitory data memory partition of the portable electronic device with the replacement set of files from the memory card without altering the generic firmware;
  rebooting, by the portable electronic device, at least the generic firmware; and
  branding or re-branding, by the portable electronic device executing a display firmware instruction, the portable electronic device to the service provider brand without altering the generic firmware or re-provisioning the portable electronic device based on the pointer or linkage pointing to at least one file of the replacement set of files at the location of the non-transitory data memory partition, wherein branding or re-branding includes configuring a display using the display firmware instruction.

11. The method of claim 10, wherein the memory card is associated with a mobile virtual network operator and the replacement set of brand files comprise any of ringtones, wallpapers, applications, screensavers, and widgets associated with at least one of themes or commercial enterprises of the mobile virtual network operator.

12. The method of claim 10, wherein the non-transitory system memory partition on the portable electronic device comprises a plurality of firmware instructions that include the reading firmware instruction and the display firmware instruction, and wherein the non-transitory system memory partition is segregated from the non-transitory data memory partition.

13. The method of claim 10, wherein the initial set of files is associated with a telecommunications service provider, and wherein the telecommunications service provider is associated with initial provisioning of the portable electronic device.

14. The method of claim 10, wherein the initial set of files is associated with an initial mobile virtual network operator and the replacement set of files is associated with a replacement mobile virtual network operator, and wherein the portable electronic device is undergoing system reset enabling the replacement mobile virtual network operator to replace the initial mobile virtual network operator for the portable electronic device.

15. A processor-implemented method of branding or re-branding a portable electronic device, comprising:
  receiving, by the portable electronic device executing at least one processor, power on activation of a generic firmware stored in a non-transitory system memory partition of the portable electronic device, wherein the generic firmware uses at least one pointer or linkage to point to a location in a non-transitory data memory partition of the portable electronic device to invoke branding or re-branding the portable electronic device;
  executing, by the portable electronic device, a downloading firmware instruction that directs downloading an initial set of files or a replacement set of files associated with a service provider brand of a service provider to the location, wherein the initial set of files or the replacement set of files comprises a branding or re-branding set of files;

based on the downloading firmware instruction, receiving, by the portable electronic device, the initial set of files or the replacement set of files from at least one of a communicatively coupled memory card or a server;

responsive to the receiving, installing, by the portable electronic device, the initial set of files or the replacement set of files in the location of the non-transitory data memory partition of the portable electronic device;

rebooting by the portable electronic device; and branding or re-branding, by the portable electronic device, the portable electronic device to the service provider brand without altering the generic firmware or re-provisioning the portable electronic device based on the generic firmware using the pointer or linkage to point to at least one file of the initial set of files or the replacement set of files, wherein the branding or re-branding includes configuring a display by using a display firmware instruction that instructs the generic firmware to display a graphic from the initial set of files or the replacement set of files.

16. The method of claim 15, wherein the receiving of the initial set of files or the replacement set of files is subsequent to an initial provisioning of the portable electronic device.

17. The method of claim 15, wherein the server is associated with at least one of a telecommunications services provider or a mobile virtual network operator.

18. The method of claim 15, wherein the non-transitory system memory partition comprises a plurality of firmware instructions that include the downloading firmware instruction and the display firmware instruction.

19. The method of claim 15, wherein the initial set of files or the replacement set of files is installed in the non-transitory data memory partition in at least one of encrypted fashion and hidden fashion.

* * * * *